United States Patent
Kimbrough et al.

(10) Patent No.: US 7,756,891 B2
(45) Date of Patent: Jul. 13, 2010

(54) PROCESS AND SYSTEM FOR MATCHING PRODUCTS AND MARKETS

(75) Inventors: Steven O. Kimbrough, Bala Cynwyd, PA (US); Ian MacMillan, Radnor, PA (US); John Ranieri, Wilmington, DE (US)

(73) Assignee: Sizatola LLC, Bala Cynwyd, PA (US)

( * ) Notice: Subject to any disclaimer, the term of this patent is extended or adjusted under 35 U.S.C. 154(b) by 235 days.

(21) Appl. No.: 11/891,947

(22) Filed: Aug. 13, 2007

(65) Prior Publication Data

US 2008/0021892 A1 Jan. 24, 2008

(51) Int. Cl.
*G06F 7/00* (2006.01)
(52) U.S. Cl. .................... 707/780; 707/758; 707/763
(58) Field of Classification Search ............. 707/3, 707/7, 10, 100–102, 104.1, 780, 758, 763
See application file for complete search history.

(56) References Cited

U.S. PATENT DOCUMENTS

| | | | | | |
|---|---|---|---|---|---|
| 5,369,763 | A | * | 11/1994 | Biles | 707/3 |
| 5,584,024 | A | * | 12/1996 | Shwartz | 707/E17.005 |
| 5,812,840 | A | * | 9/1998 | Shwartz | 707/E17.005 |
| 5,838,965 | A | * | 11/1998 | Kavanagh et al. | 707/103 R |
| 5,845,278 | A | * | 12/1998 | Kirsch et al. | 707/3 |
| 5,873,076 | A | * | 2/1999 | Barr et al. | 707/3 |
| 5,878,423 | A | * | 3/1999 | Anderson et al. | 707/100 |
| 5,920,854 | A | * | 7/1999 | Kirsch et al. | 707/3 |
| 5,974,572 | A | * | 10/1999 | Weinberg et al. | 714/47 |
| 5,987,460 | A | * | 11/1999 | Niwa et al. | 707/6 |
| 6,076,086 | A | * | 6/2000 | Masuichi et al. | 707/3 |
| 6,112,181 | A | * | 8/2000 | Shear et al. | 705/1 |
| 6,233,575 | B1 | * | 5/2001 | Agrawal et al. | 707/6 |
| 6,236,991 | B1 | * | 5/2001 | Frauenhofer et al. | 707/6 |
| 6,393,427 | B1 | * | 5/2002 | Vu et al. | 707/101 |
| 6,446,061 | B1 | * | 9/2002 | Doerre et al. | 707/3 |
| 6,549,944 | B1 | * | 4/2003 | Weinberg et al. | 709/224 |
| 6,631,496 | B1 | * | 10/2003 | Li et al. | 715/200 |

(Continued)

OTHER PUBLICATIONS

Tomek Strzalkowski—"Natural language Information retrival"—Information processing & Management, vol. 31, No. 3 1995 (pp. 397-417).*

(Continued)

*Primary Examiner*—John E Breene
*Assistant Examiner*—Anh Ly
(74) *Attorney, Agent, or Firm*—Montgomery, McCracken, Walker & Rhoads, LLP; Evelyn H. McConathy

(57) ABSTRACT

The present invention provides a search method and system for matching a commodity to one or more applications for using the commodity. A plurality of properties associated with the commodity are identified. A collection of documents for searching for a plurality of combinations of said properties is then defined, wherein the combination includes a single property or multiple properties. The defined collection of documents is searched for all occurrences of the combination of properties, and the hits retrieved for those documents that include the properties. The hits are then associated with one or more subclasses of a classification scheme, and reviewed for those hits that include the properties of the commodity but not the commodity, wherein subclasses not including hits that include the commodity are matched as applications for the commodity.

9 Claims, 1 Drawing Sheet

U.S. PATENT DOCUMENTS

| | | | |
|---|---|---|---|
| 6,678,694 B1* | 1/2004 | Zimmermann et al. | 707/102 |
| 6,718,365 B1* | 4/2004 | Dutta | 709/203 |
| 6,751,600 B1* | 6/2004 | Wolin | 706/12 |
| 6,789,076 B1* | 9/2004 | Dutta | 707/5 |
| 6,789,252 B1* | 9/2004 | Burke et al. | 717/100 |
| 6,839,680 B1* | 1/2005 | Liu et al. | 705/10 |
| 6,847,972 B1* | 1/2005 | Vernau et al. | 707/101 |
| 6,885,734 B1* | 4/2005 | Eberle et al. | 379/88.01 |
| 6,999,959 B1* | 2/2006 | Lawrence et al. | 707/5 |
| 7,016,886 B2* | 3/2006 | Cabana et al. | 706/39 |
| 7,143,066 B2* | 11/2006 | Shear et al. | 705/54 |
| 7,181,438 B1* | 2/2007 | Szabo | 707/2 |
| 7,305,415 B2* | 12/2007 | Vernau et al. | 707/103 Z |
| 7,319,976 B1* | 1/2008 | Peckover | 705/14 |
| 2001/0000356 A1* | 4/2001 | Woods | 707/3 |
| 2001/0021931 A1* | 9/2001 | Vaughan | 707/100 |
| 2001/0047353 A1* | 11/2001 | Talib et al. | 707/3 |
| 2002/0023091 A1* | 2/2002 | Silberberg et al. | 707/103 Y |
| 2003/0041055 A1* | 2/2003 | Nakamura et al. | 707/3 |
| 2003/0217052 A1* | 11/2003 | Rubenczyk et al. | 707/3 |
| 2004/0267740 A1* | 12/2004 | Liu et al. | 707/3 |
| 2005/0091211 A1* | 4/2005 | Vernau et al. | 707/6 |
| 2005/0114325 A1* | 5/2005 | Liu et al. | 707/3 |
| 2007/0156677 A1* | 7/2007 | Szabo | 707/5 |
| 2008/0097872 A1* | 4/2008 | Peckover | 705/26 |
| 2008/0147663 A1* | 6/2008 | Vernau et al. | 707/7 |
| 2008/0243721 A1* | 10/2008 | Joao | 705/36 R |

OTHER PUBLICATIONS

Houston et al.—"Medical data mining on the Interent" research on a cancer information system—Artificial Intelligent review vol. 13, No. 5-6, Dec. 1999, (pp. 437-466).*

Glockner et al.—"A system for the content-based retrieval of textual and non-textual document using a Natural language Interface"—Informtik, Jul. 1998, (pp. 1-34).*

* cited by examiner

PROCESS AND SYSTEM FOR MATCHING PRODUCTS AND MARKETS

CROSS REFERENCE TO RELATED APPLICATION

This application claims priority to U.S. Provisional Application No. 60/329,703, filed Oct. 16, 2001, which is herein incorporated in its entirety.

BACKGROUND

The present invention is related to information retrieval. More specifically, the present invention is related to matching products to markets using information retrieval.

Access to the right information is invaluable in the development of new ideas and business opportunities. Most individuals generate new ideas in areas for which they are familiar, matching a new idea with an area that is generally associated with the technology encompassing the idea. Accordingly, research that is conducted relating to the new idea is usually limited to those areas known by the individual.

Current information retrieval systems which may conduct the above research utilize such techniques as boolean or natural language word searches to locate information directly relating to the idea or product that is the subject of the research. Again, this type of search limits the individual's access to information that either confirms what was already known or broadens the individual's knowledge about the already known area.

This method of researching information related to a particular idea or product will likely not result in the location of information in areas beyond those that specifically include the search terms that were used to conduct the boolean or natural language searches. The limited scope of these research methods leaves the user with a limited understanding of the idea or product's usefulness.

Therefore, there exists a need for an improved search process.

SUMMARY

The present invention provides a search method and system for matching a commodity to one or more applications for using the commodity. A plurality of properties associated with the commodity are identified. A collection of documents for searching for a plurality of combinations of said properties is then defined, wherein the combination includes a single property or multiple properties. The defined collection of documents is searched for all occurrences of the combination of properties, and the hits retrieved for those documents that include the properties. The hits are then associated with one or more subclasses of a classification scheme, and reviewed for those hits that include the properties of the commodity but not the commodity, wherein subclasses not including hits that include the commodity are matched as applications for the commodity.

Additional objects, advantages and novel features of the invention will be set forth in part in the description and figures which follow, all of which are intended to be for illustrative purposes only, and not intended in any way to limit the invention, and in part will become apparent to those skilled in the art on examination of the following, or may be learned by practice of the invention.

BRIEF DESCRIPTION OF THE DRAWINGS

The foregoing summary, as well as the following detailed description of the invention, will be better understood when read in conjunction with the appended drawing. For the purpose of illustrating the invention, there are shown in the drawing, certain embodiment(s) which are presently preferred. It should be understood, however, that the invention is not limited to the precise arrangements and instrumentalities shown.

DESCRIPTION OF THE PREFERRED EMBODIMENT(S)

Figure 1:
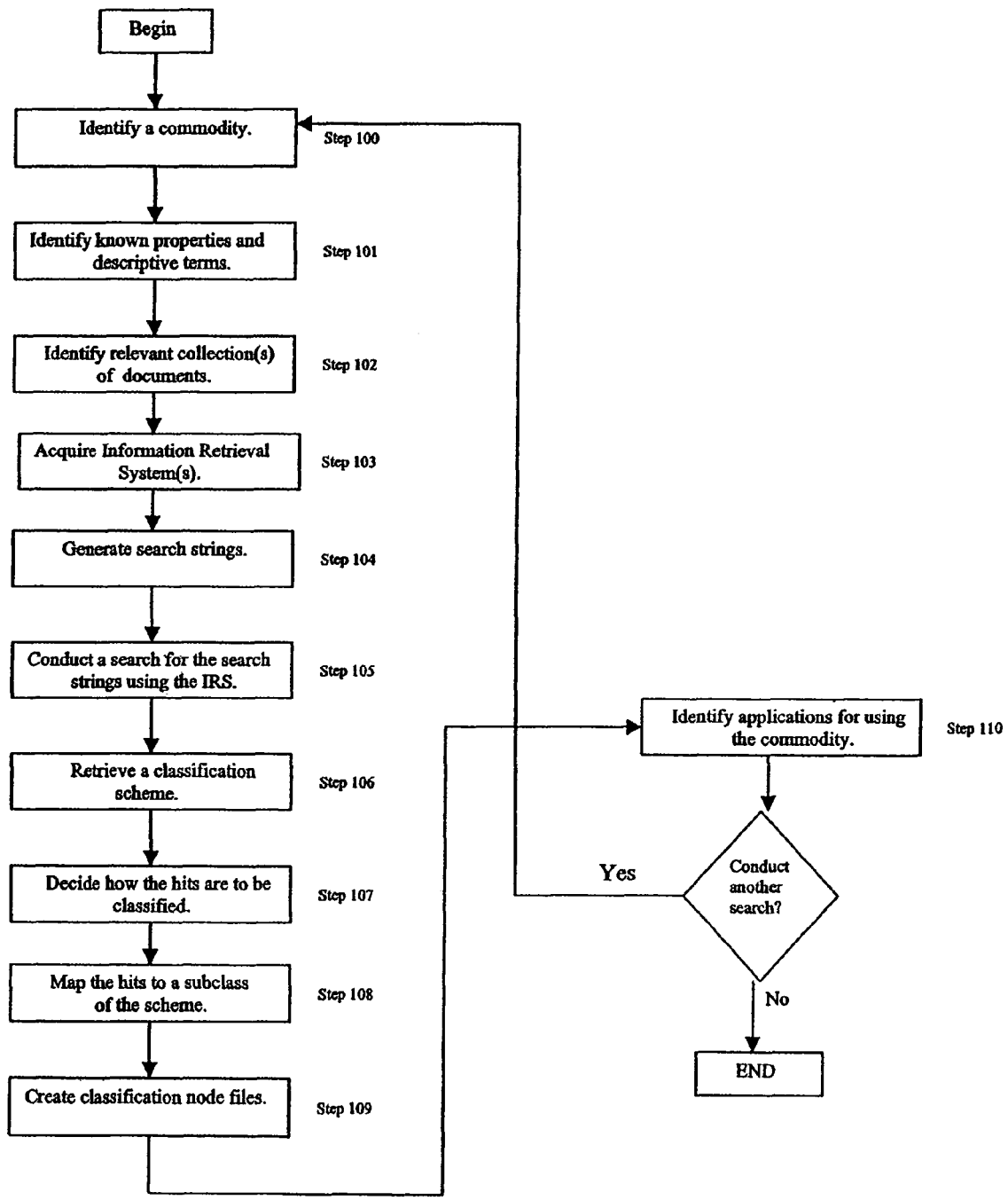
FIG. 1 is a flow diagram of the search process in accordance with a preferred embodiment of the present invention.

The present invention provides a search method and system for matching with known and unknown applications, uses, markets and/or industries. This method discloses a novel method of providing information beyond that which is generally associated with the subject commodity. Access to this expanded information allows the user to expand the scope of the usefulness of a commodity in order to find uses, applications, and markets for the commodity that were not, and would not have been, originally considered by the user. Alternatively, the present invention allows the user to find commodities from a given use, application, market or industry that would not have been originally considered.

In a preferred embodiment of the present invention, the method and system utilizes existing and/or new classification schemes on collections of text in order to assist a user in hypothesizing regarding unknown properties of a commodity. It should be noted that "commodity," as used herein, is construed broadly to include, but not be limited to, a technology, methodology, an idea, an invention, a product and services, which may be actual, envisioned, or even hypothetical. Given a commodity's known properties and descriptors, preferably using Information Retrieval techniques, a plurality of documents are found that are associated with and about these properties and descriptors. Each of the plurality of documents is then mapped to classification schemes of interest, which may suggest hypotheses regarding new properties or applications of the commodity. In particular, if a commodity's known properties are associated with additional properties that fall into a certain category, e.g., category A, then category A can be used to suggest new properties of the commodity. For example, if antiangiogenesis is a property associated with thalidomide, and many of the documents retrieved using the Information Retrieval techniques are not about thalidomide, but they are about antianiogenesis, and the documents regarding antianiogenesis may be classified as documents about cancer treatments, then there is a presumptive connection between thalidomide and cancer treatments.

FIG. 1 is a flow diagram of the search method in accordance with a preferred embodiment of the present invention. A customer wishing or intending to obtain extensive information from the user regarding a certain commodity, as defined above, identifies a commodity to be matched with one or more novel uses, applications, markets or industries (Step 100). For purposes of this disclosure, "markets" refers to connections between ideas and commodities that may or may not have been previously considered. Once a commodity has been identified, known properties, attributes, descriptive terms, etc. are developed for the identified commodity (Step 101). The known properties and descriptive terms may include, but are not limited to, known characteristics of the commodity, known industries associated with the commodity, attributes of the commodity, such as its texture, use, associations, designations and the like. These descriptive words and properties may be derived from dictionaries and thesauruses, for example, or generated by an automated means, such as an electronic thesaurus or electronic means. It should be noted that the properties and descriptive words may be unlimited and may go beyond words that specifically describe the identified commodity, which can be generated, e.g., via a process of structured interviews, careful reading of known source materials, and feedback from experts. Returning to the earlier example, for instance, properties relating to the term thalidomide may be very diverse, including, e.g., causing relaxation, teragenesis (causing birth defects), and antiangiogenesis (inhibiting formation of blood vessels).

Once the properties have been generated, a relevant collection of documents to search is preferably identified (Step 102). The collection of documents may include a pre-existing search database, i.e., the United States Patent and Trademark Office (USPTO) patent and application database, private collections, government documents, online databases and collections associated with search engines, such as Google, Dialog, Medline, Lexis/Nexis, etc. The collection of documents chosen depends on the commodity identified and the generated properties. It should be noted that the choice of the collection of documents is not limited to choosing one collection, multiple collections of documents may be utilized. It should also be noted that the collection of documents may be a collection that was generated by the present invention. As disclosed hereinbelow, the present invention produces a number of files that contain hits from past searches. These past search files may be used to conduct more narrow searches.

Based in part on the collection of documents that have been chosen, an Information Retrieval System (IRS) is preferably acquired (Step 103). The IRS will be the query and retrieval system or means that actually identifies hits (documents) associated with the properties that have been generated in Step 101. Preferably, a pre-existing IRS system is chosen, although an IRS may be utilized that has been designed to conduct a search in accordance with the present invention. The IRS may be a proprietary system for proprietary collections, a standard search engine for Internet documents or a commercial information retrieval engine, for example.

In order to conduct the search using the IRS(s) chosen in Step 103, search strings must be generated (Step 104). Search strings are preferably generated by combining one or more of the properties that were generated in Step 101. The combinations may be arranged using boolean connectors, e.g., and, or, /s (in the same sentence as), etc. Although a boolean search is preferred, any type of search may be utilized that takes the generated properties and forms a search string. The generated search strings are preferably used to search the selected collection(s) of documents.

In an alternative embodiment, a method is utilized which automatically generates the search strings. This alternative method takes the generated properties from Step 101 and creates a plurality of possible combinations of the properties alone and together with other properties. Once all possible combinations have been generated, a search is conducted for each combination using the IRS(s) chosen in Step 103. The number of hits found for each of the combinations is tallied and utilized to determine the best search strings based on a predetermined criteria, e.g., number of documents found must be within a predetermined numerical range. The combination search strings that meet the predetermined criteria are utilized as the search strings for Step 105, to be disclosed hereinafter.

As stated, the search strings found in Step 104 are input in the IRS(s) chosen in Step 103, wherein a search is conducted to find all hits that have the search string located therein (Step 105). A "hit" is defined as a record returned by an IRS, broadly construed. The hits that are found are identified, counted and saved.

Each hit may include the entire document or information about the original document, such as the title, author(s), ISSN, abstract, etc., that contains the search string. The type of information included with the hit is dependant on the user's accessibility to the information in the IRS and the information provided by the IRS. Some IRSs do not have access to entire documents and only provide citations of relevant documents or abstracts thereof. Accordingly, the results of string searches on the chosen IRS(s) result in one or more files that include a combination of document descriptions and full-text documents that are related to the identified commodity's properties and attributes chosen in Step 101.

In an alternative embodiment, the user may filter the hits retrieved by reviewing the hits and determining whether the hit is reasonable in view of the identified commodity or in view of predetermined parameters set for a given search, e.g., industries that should not be considered. For example, if the identified commodity is aluminum, and a search string of the properties of aluminum was found in hits relating to diapers, and the diaper industry is one in which aluminum would never be used, or is an area the requesting customer would never enter into, the user may filter out any hits that are related to diapers, thus narrowing the number of hits to be reviewed.

Similar to the ability to filter the retrieved documents, the user may be able to expand the list of hits found by analyzing the hits received and generating broader or narrower properties that were not considered in the initial generation of properties disclosed in Step 101. Generation of these alternate properties may then require the user to redefine the collection of documents to search (Step 102) and conduct a search on a new set of search strings (Steps 103, 104 and 105). As stated above, the file(s) containing the original list of hits may be used as a selected collection of documents, which acts as a means of limiting the hits to a more narrow area. Since the present invention allows the user to utilize multiple collections of documents, the file(s) of previous hits may be one of a plurality of collections of documents selected for the secondary search.

Once the user is comfortable with the hits that have been retrieved, a classification scheme(s) for classifying the hits is retrieved by the user (Step 106). The "classification schemes" as defined in the present invention are methods of categorizing information using a predetermined set of criteria. As those skilled in the art know, classification schemes are hierarchical, tree-like structures, wherein the leaf nodes of the tree (at the lowest level), correspond to specific items. An exemplary pre-existing classification that may be used in this step is the Library of Congress (LoC) classification scheme. As those having skill in the art of classification know, at the highest level, after the root of the tree, the nodes in the LoC are labeled with single letters of the alphabet, e.g., A for "General Works", B for "Philosophy, Psychology, Religion," T for "Technology" and so on. Single letters followed by single letters constitute the next more specific level, e.g., BC for "Logic" and BF for "Psychology." After that, a numbering scheme is used, e.g. BC 11-39 is for the history of logic. The scheme continues for several levels. In the preferred embodiment, a file is created that captures a particular classification scheme and maps the nodes of the particular classification scheme to standard Node ID notations in accordance with the present invention.

An exemplary file which reproduces a portion of the LoC classification scheme and identifies each node and leaf node of the scheme with a Node ID of the present invention is illustrated in Table I below. In Table I, Node ID is a number is our scheme, which uses a standard notation. Thus, node 1 is parent of node 1.1, 1.2, . . . 1.n. Similarly, 1.2 is parent of 1.2.1, 1.2.2, . . . 1.2.n, and so on for as deep as the classification scheme goes. LoC Node ID is the ID of the node as provided in the LoC classification system, and LoC Description of the Node is the LoC's description of the meaning of the corresponding node.

TABLE I

| Node ID | LoC Node ID | LoC Description of Node |
| --- | --- | --- |
| 1.1.1.4 | AC901-995 | Pamphlet collections |
| 1.1.1.5 | AC999 | Scrapbooks |
| 1.2 | AE | Encyclopedias |
| 1.2.1 | AE1-90 | Encyclopedias |
| 1.2.1.1 | AE5-90 | By language |
| 1.3 | AG | Dictionaries and other general reference works |
| 1.3.1 | AG2-600 | Dictionaries and other general reference works |
| 1.4 | AI | Indexes |
| 1.4.1 | AI1-21 | Indexes |
| 1.5 | AM | Museums. Collectors and collecting |
| 1.5.1 | AM1-501 | Museums. Collectors and collecting |

Other examples of preexisting classification schemes are the USPTO classification scheme, the Dewey Decimal Classification System, Standard Industrial Codes, and ICD-9. An example of a file which reproduces a portion of the USPTO classification scheme is illustrated in Table II.

TABLE II

| Node ID | USPTO Node ID | USPTO Node Description |
| --- | --- | --- |
| 1 | class 2 | APPAREL |
| 1.1 | subclass 1 | MISCELLANEOUS |
| 1.2 | subclass 455 | GUARD OR PROTECTOR |
| 1.2.1 | subclass 456 | Body cover |
| 1.2.1.1 | subclass 457 | Hazardous material body cover |
| 1.2.1.2 | subclass 458 | Thermal body cover |
| 1.2.1.3 | subclass 2.11 | Astronaut's body cover |

Although exemplary classification schemes have been disclosed in the present invention, any other classification scheme may be utilized as well. The present invention is not limited though, to pre-existing classification schemes. Classification schemes generated by human intuition, based on the hits that have been received or the properties that have been used, for example, may also be utilized by the user. The present invention does not limit the user to selecting one classification scheme, multiple classification schemes may be utilized at the user's discretion.

Once the user has selected the classification scheme(s), a decision as to how the hits are going to be associated with the selected classification subclasses is preferably made (Step 107). The present invention has available two methods of associating the hits with the classification subclasses, direct and indirect association.

"Direct association" is the direct mapping of a hit with a classification subclass using information included with the hit. For example, an exemplary hit, DOC 1, is a patent. As is known to those familiar with patents, each invention is classified by the Patent Office into particular classes and subclasses. Depending on the invention, the Patent Office may classify the invention into a plurality of classes and subclasses. If the user has selected to use the USPTO classification scheme, a direct association of DOC 1 to the classes and subclasses of the USPTO classification subclasses may be conducted using the class and subclass numbers associated with DOC 1 by the Patent Office. In a preferred embodiment, direct association is conducted automatically using the selected classification scheme and a classification node files, to be disclosed hereinafter.

Another example would be to utilize the LoC classification scheme and associate a hit comprising a LoC call number to the subclass associated with the call number in the LoC classification scheme. It is apparent to those having skill in the art that any hit that comprises a classification number of a pre-existing classification scheme, selected by the user, can be directly associated with the selected classification scheme using the classification number included with the hit.

"Indirect association" is the association of a hit to a selected classification scheme subclass based on information other than a classification number directly related to the classification scheme. Indirect association may utilize imperfect matching, which uses human judgment as a means of associating a hit with a subclass. Imperfect matching may also use association of information included with the hit that is not able to be directly associated with a subclass, e.g., an ISSN number. An example of a method of imperfect matching uses a sample of the hits that have been retrieved and, using human judgment, associates a hit with a subclass of the selected classification scheme. Then all remaining hits that are similar to the associated hit are also associated with the subclass.

The association of information included with the hit may be utilized in a similar manner as the above disclosed method. A relationship between the information included with the hit and a subclass of the selected classification scheme is determined using table algorithms that consider the subject matter of the hits and the information that may be associated with the subclasses of the classification scheme. As stated, an example is an ISSN included with a hit. The present invention determines an association between the ISSN and a subclass of the selected classification scheme. For example, suppose that a "hit" cites an article in the journal *Communications of the ACM*. The ISSN number is 0001-0782, and would be present in the hit record, typically. The present invention extracts the ISSN number from the hit record (by pattern matching on text) sand checks to see if the LoC call number for that ISSN number exists in LoC table, as exemplified in Table III.

TABLE III

| ISSN | LoC |
| --- | --- |
| 1367-4803 | QH324.2.C64 |
| 0006-3592 | QH324.B5 |
| 0916-8451 | QH345.A35 |
| 0300-5127 | QH345.523a |
| 1389-0344 | QH426.G44 |
| 0890-9369 | QH426.G466 |
| 0002-9297 | QH431.A1A5 |
| 0026-8925 | QH431.M552 |
| 0027-5107 | QH431.M97 |
| 1356-9597 | QH441.5.G46 |
| 1066-5099 | QH442.2.I57 |

If the ISSN exists, the system looks up the ISSN and uses the result in mapping to the LoC classification file. If the ISSN does not exist, an exception report is generated by the system and a human or automated process looks up the LoC call number for that ISSN and/or serial title.

After determining how the hits are to be associated with the classification scheme subclasses, mapping of the hits to the appropriate subclasses is performed, building a mapping table (index table) (Step 108). An exemplary mapping table is illustrated in Table IV. As illustrated, the resulting mapping table comprises the classification node ID and file ID, although, any other information may be included in the mapping table, depending on the information to be provided.

TABLE IV

| Node ID | File ID |
| --- | --- |
| 362.3.13.69.105.89 | 1-6417153.html |
| 143.1.1.1 | 2-6416633.html |
| 109.2.48.66.30 | 3-6416624.html |
| 105.1.6.73 | 4-6416613.html |
| 105.1.6.47 | 5-6406577.html |
| 105.1.6.47 | 6-6406576.html |
| 80.16.67.139 | 7-6390021.html |
| 373.1.8.19.40 | 8-6380336.html |
| 362.3.13.69.106 | 9-6380149.html |
| 315.51.166 | 10-6379753.html |
| 362.3.13.69.107 | 11-6376452.html |
| 316.35.110.107 | 12-6376045.html |
| 334.18 | 13-6371842.html |
| 1.10.57 | 14-6360374.html |

Each hit is given an ID, has its text processed for convenient display, and is then written to a unique HTML file (in a preferred embodiment), suitable for subsequent viewing through a standard web browser.

The mapping table is stored and utilized in creating classification node files (Step 109). A "classification node file" is a file that comprises information, including statistical information, regarding the hits associated with each node in the classification scheme. This information includes, at least, (1) the number of files associated with the children of the node or the node itself, (2) the actual hits that were retrieved and associated with the node, (3) the actual hit associated with the node, and (4) any other information as desired. The classification node files allow the user to navigate through the retrieved information such that an individual would be able to see how many documents are associated with some classification and view the hits that are linked to the classification node. As one skilled in the art would know, each parent node is linked to its respective children, and so on.

In an alternative embodiment, information included in the classification node files can be displayed in an electronic tree, allowing the user to navigate through the retrieved hits faster since the user is able to see the tree and what each node means, as well as see the statistics regarding what was found and actually view the hits under particular classifications.

Upon review of the hits that are found in particular nodes, possible applications are identified and defined (Step 110). These possible applications may relate to different uses of the identified commodity that were not considered in the past. The applications may be identified by examining the documents that are associated with identified properties of the commodity, but not associated with the actual commodity. If these documents relate to a particular category or industry, then an association may be made between the commodity and the particular category. Returning again to the example discussed above, if the drug thalidomide (commodity) has a property of angiogenesis, and there are documents relating to angiogenesis that are not related to thalidomide, and some of the documents not related to thalidomide can be categorized as being about some form of cancer, then an association may be hypothesized that thalidomide may interact with cancer through the angiogenesis property.

It should be noted that examination of the documents and determination of a possible new commodity association with a category is preferably accomplished using human judgment. Although it is preferable to use human judgment, this examination and determination may be automated. For example, an automation method may rank order the properties identified in step 101 based on the strength of their association with the documents in a selected subclass; or rank order the documents in a selected subclass based on the strength of their association with a selected property. Although two methods of automatically generating a possible opportunity have been disclosed, other methods of generating possible meaningful opportunities may be utilized and fall within the scope of the present invention.

The user, upon examining and determining any possible opportunities, may then start the search method again utilizing properties that were identified from the method disclosed above (Step 101) and may or may not have been considered before.

The search method and system of the present invention innovatively combines principles and techniques from Information Retrieval and matches commodity descriptions with potential applications and industries.

Although the method of the present invention has been disclosed as generating possible novel applications or unknown properties of a given commodity, as defined herein, alternatively, the method and system of the present invention may generate a commodity, as defined herein, from a given application, use or market. Returning again to the example used hereinbefore, if an application is identified, such as cancer treatment, the method and system of the present invention returns unanticipated or novel commodities, such as thalidomide, using properties or descriptive words of the application.

While the foregoing specification has been described with regard to certain preferred embodiments, and many details have been set forth for the purpose of illustration, it will be apparent to those skilled in the art without departing from the spirit and scope of the invention, that the invention may be subject to various modifications and additional embodiments, and that certain of the details described herein can be varied considerably without departing from the basic principles of the invention. Such modifications and additional embodiments are also intended to fall within the scope of the appended claims.

What is claimed:

1. A method for searching recorded information to provide pattern-oriented matching of a commodity to one or more unanticipated applications for using the commodity, the method comprising the steps of:

identifying at least one property associated with the commodity, wherein the at least one property further comprises known or hypothesized characteristics of the commodity, industries associated with commodity and attributes of the commodity;

identifying a collection of documents for searching for the at least one property or combination of properties;

searching the defined collection of documents for said the property or combination of the properties, using information retrieval methods in conjunction with search terms and patterns of search terms and phrases used to describe the property or combination of properties;

identifying and retrieving hits from the collection of documents, wherein the one or more patterns of terms and phrases match the search terms;

mapping the hits to one or more subclasses of a pre-existing classification scheme;

creating a classification file comprising statistical information regarding mapping the hits with each category in the classification scheme;

identifying from the resulting classification file, mapping table(s) associated with the at least one identified property that is associated with the commodity, wherein the subclasses associated with such mapping table(s) are matched as unanticipated applications of the commodity, although the hits need not expressly identify the commodity; and reporting the identified match of the commodity to one or more unanticipated applications for using the commodity.

2. The method of claim 1, wherein the hits further comprise one or more documents in the collection of documents related to at least one property or combinations of properties associated with the commodity or information relating thereto.

3. The method of claim 2, wherein the information comprises a classification identifier denomination, wherein said classification identifier associates a hit comprising the classification identifier to one or more of the subclasses of the classification scheme.

4. The method of claim 3, wherein the classification identifier comprises a Library of Congress call identifier (call number or ISSN number) and the classification scheme comprises a Library of Congress classification scheme.

5. The method of claim 3, wherein the classification identifier comprises a patent class identifier (class or subclass number) and the classification scheme comprises a patent classification scheme.

6. The method of claim 5, wherein the classification identifier comprises a United States Patent and Trademark Office (USPTO) class identifier (class or subclass number) and the classification scheme comprises a USPTO classification scheme.

7. The method of claim 1 further comprising a step of identifying a second plurality of properties associated with the applications.

8. The method of claim 7, wherein the step of identifying a second plurality of properties comprises searching for matching words, search terms and patterns of search terms and phrases in the hits included in a subclass, wherein the commodity is not expressly identified; but wherein the similar words, search terms and patterns of search terms and phrases identify the second plurality of properties associated with the commodity.

9. The method of claim 7, wherein defining a plurality of combinations of properties to be searched in the defined collection of documents comprises the steps of: identifying all combinations of the properties; searching the defined collection of documents; and statistically ranking properties relative to number of hits.

* * * * *